United States Patent [19]

Molitorisz

[11] 4,302,923
[45] Dec. 1, 1981

[54] METHOD FOR MAKING LARGE RECTANGULAR BALES

[76] Inventor: Joseph Molitorisz, 624 81st Ave. NE., Bellevue, Wash. 98004

[21] Appl. No.: 99,642

[22] Filed: Dec. 3, 1979

Related U.S. Application Data

[63] Continuation-in-part of Ser. No. 67,187, Aug. 16, 1979, Pat. No. 4,270,446, which is a continuation-in-part of Ser. No. 923,829, Jul. 12, 1978, Pat. No. 4,175,487.

[51] Int. Cl.³ .................. A01D 35/00; B30B 15/32
[52] U.S. Cl. ........................................ 56/341; 100/3; 100/40; 100/81
[58] Field of Search .............. 100/77, 80, 81, 100, 100/8, 3, 35, 40; 56/341

[56] References Cited

U.S. PATENT DOCUMENTS

| | | | |
|---|---|---|---|
| 51,212 | 11/1865 | Price | 100/80 |
| 187,814 | 2/1877 | Clemens | 100/80 |
| 400,912 | 4/1889 | Heffley | 100/81 |
| 532,386 | 1/1895 | Murray | 100/77 |
| 652,383 | 6/1900 | Calton | 100/80 |
| 705,135 | 7/1902 | Pope | 100/81 |
| 908,676 | 1/1909 | Jones | 100/80 |

Primary Examiner—Billy J. Wilhite

[57] ABSTRACT

Layers of fibrous material are deposited in a bale forming chamber in continuous folded-like arrangement. The deposition and compaction of the subsequent folded-like layers is accomplished in a continuous process in which the bale forming chamber and the feeder-compactor mechanism perform a reversing-oscillating motion relative to each other imparting the necessary forces and displacement on the fibrous material to form rectangular bales with sufficiently high density.

6 Claims, 8 Drawing Figures

METHOD FOR MAKING LARGE RECTANGULAR BALES

This application is a continuation-in-part of my application Ser. No. 67,187, Filed Aug. 16, 1979. Now U.S. Pat. No. 4,270,446 which was a continuation-in-part of application Ser. No. 923,829, filed July 12, 1978, now U.S. Pat. No. 4,175,487.

BACKGROUND OF THE INVENTION

Field of the Invention

This invention pertains to methods for compressing fibrous materials into rectangular bales. The invention has particular application to agricultural uses such as the compaction of hay or the like into relatively large size and substantially rectangular bales, but also industrial utility for the compaction of other fibrous materials. The compaction technique is of the type in which layers of fibrous material are deposited in a bale forming chamber in continuous folded-like and substantially parallel arrangement. The deposition and compaction of the subsequent folded-like layers is accomplished in a continuous process in which a bale forming chamber and a feeder-compactor mechanism perform a reversing-oscillating motion relative to each other imposing the necessary forces and displacement on the fibrous material to form rectangular bales with sufficiantly high density.

Summary of the Objects and Functions

It is the primary object of this invention to provide a commercially feasible method for making relatively large size rectangular bales from agricultural crops or industrial products.

Another object is to provide a simple and reliable method which embodies a unique technique by providing for both feeding and compaction by the same components and in one operating function.

Further object is to provide a simple and reliable method for the sufficiently even distribution of the fibrous material over the relatively large surface area of the bale being formed.

Another object is to provide for an energy saving method for making highly compacted large size rectangular bales, which is not characterized by high peak power loads followed by retractive cycles when the undesired expansion of the already compacted layers can occure. Furthermore, substantial reduction in energy requirement is achieved by the application of the technique which may be described as; reversing-oscillating relative motion between the feeder-compactor mechanism and the bale forming chamber, by providing for a continuous transfer, deposition and compaction of the subsequent composite layers of fibrous material in folded-like arrangement, not requiring the separation of these layers by shearing or other energy consuming means.

Another significant object of this invention is to provide a method which does not require high operational speed for its major functional components, thus the wear of those components can be reduced and the useful life of the apparatus can be extended.

Further object is to provide a method of making rectangular bales which does not require the exact synchronization of several major functional elements of the apparatus, thus reducing the frequency of mechanical failures.

These objects are obtained by a method having the steps; of conveying the fibrous material to the feed-opening of a feeder-compactor mechanism, partially compacting the loose fibrous material into mat-like configuration and imparting sufficient forces to cause its transfer into the confined cavity of the bale forming chamber which is positioned above the feeder-compactor mechanism. As the result of the reversing-oscillating relative motion between the feeder-compactor mechanism and the bale forming chamber, the feed-opening of the feeder-compactor mechanism which merges directly without interruption with the confined cavity of the bale forming chamber performs a reversing-oscillating motion between two opposite boundaries of the open intake port of the bale forming chamber. The open intake port of the bale forming chamber is partially closed by belts or chains to prevent the undesired exiting of the deposited layers of fibrous material, however, the merging feed-opening remains open during the bale making process. At the beginning of the operation of the apparatus the partially compacted fibrous material is forced through the feed-opening of the feeder-compactor mechanism by the pickup mechanism. The transferred fibrous material is deposited on the retaining belts or chains as it is forced to follow the movement of the bale forming chamber. The continuous transfer of the partially compressed fibrous material and the reversing-oscillating relative motion between the feeder-compactor mechanism and the bale forming chamber produces a folded-like arrangement of the subsequent layers under the already deposited layers of the partially completed bale. As the weight of the deposited layers or other applied forces on them increase the agressivness of the feeding of the apparatus also increases. The flow of the loose fibrous material to the feeder-compactor mechanism is maintained until the entire volume of the bale forming chamber becomes filled with sufficiently compacted layers. Through the positioning of the bale forming chamber above the feeder-compactor mechanism the gravitational forces in the form of the weight of the deposited material are fully utilized, thus eliminating the use of mechanical components, such as the movable platen.

The method of this bale making process is applicable to practically any size bale. However, the prime object of this invention was to provide an energy-saving, high throughput capacity and reliable apparatus for making large size rectangular bales.

This bale forming method can be applied in apparatus where the reversing-oscillating relative motion is performed by the bale forming chamber, while the feeder compactor mechanism remains stationary. It is also applicable to an apparatus in which the bale forming chamber remains stationary during the bale forming process and the reversing-oscillating relative motion is performed by the feeder-compactor mechanism. In another alternative configuration the reversing-oscillating relative motion is obtained from the simultaneous and opposing motions of the bale forming chamber and the feeder-compactor mechanism.

DESCRIPTION OF THE PREFERRED EMBODIMENT

For the purpose of this description the invention is illustrated as applied to agricultural apparatus especially designed for mobile use on field of fibrous agricultural crops such as hay. The details of this apparatus are described in my copending applications: Ser. No. 923,829, now U.S. Pat. No. 4,175,487 Ser. No. 06/067,187, now U.S. Pat. No. 4,270,446 and only sufficient description to understand the principles of this invention will be presented. It should be understood that the principles of this invention have wider application than agricultural apparatus and are suitable to the compaction of other fibrous material such as, for example, crops, refuse, paper plastic etc. The principles are equally applicable to stationary as well as to mobile apparatus.

Figure 1:
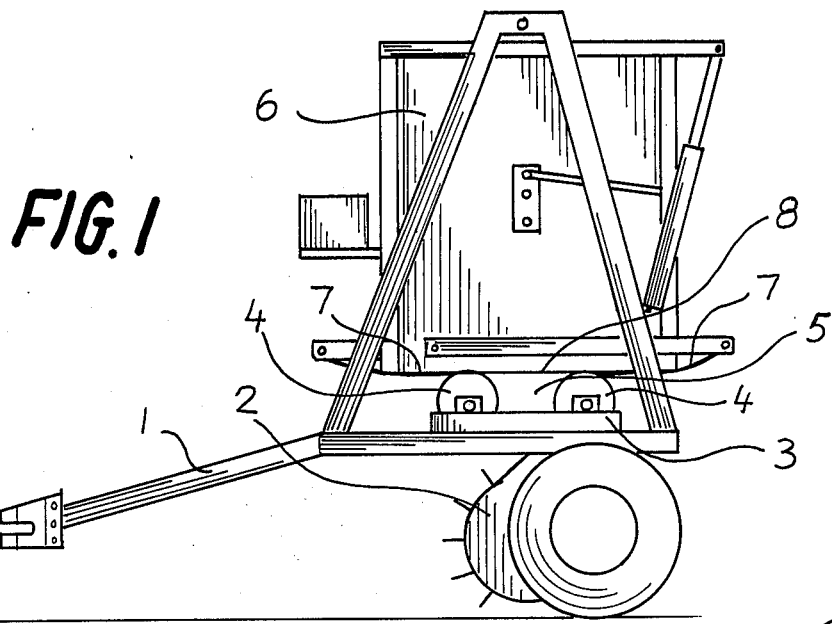
FIG. 1 is a side elevation of the mobile apparatus with the bale forming chamber in its mid-position.

The mobile apparatus shown on FIG. 1 includes a trailer frame (1). The pickup (2) collects the windrowed crop and delivers it to the feeder-compactor mechanism (3). The feeder-compactor rollers (4) confine a transverse feed-opening (5). The feeder-compactor rollers (4) and the bale forming chamber (6) are interconnected by a plurality retainer belts or chains (7). One end of each of the belts or chains is partially wrapped around the peripheral surface of the corresponding feeder-compactor roller while the other end is securely attached to a structural member of the bale forming chamber. The length of the belts or chains is made sufficient to allow the desired relative motion of the bale forming chamber and the feeder-compactor mechanism. The belts partially close the open intake port of the bale forming chamber (8) holding the transferred and deposited fibrous material in the cavity of the bale forming chamber. The feed-opening (5) and the open intake port (8) remain merged directly during the bale forming process allowing the transfer and deposition of the incoming layers of fibrous material. The illustrated apparatus has two hydraulic cylinders which power the bale forming chamber to perform a pendulum-like reversing-oscillating motion relative to the feeder-compactor mechanism. At least one set of the retaining belts (7) is made removable to allow the discharge of the finished bale from the bale forming chamber, as it is moved to its discharge position. In this particular illustration the feeder-compactor mechanism remains stationary.

Figures 2A, 2B, 2C:
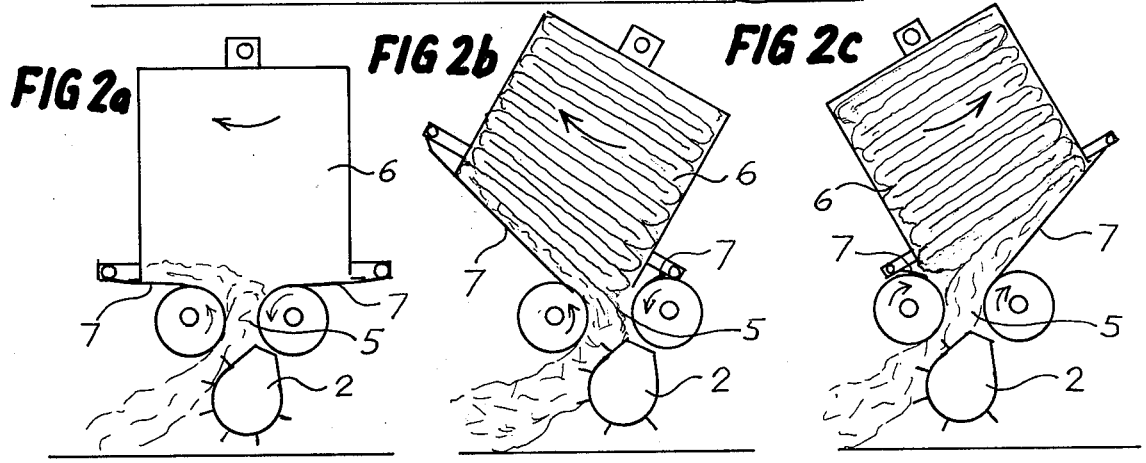
FIG. 2a is a schematic crossectional view of the mobile apparatus with the bale forming chamber in its mid-position receiving the first layer of fibrous material.
FIG. 2b is a schematic crossectional view of the mobile apparatus with its bale forming chamber in the foreward moving position.
FIG. 2c is a schematic crossectional view of the mobile apparatus with its bale forming chamber in the rearward moving position.

The method of forming the bale is shown on FIG. 2a, FIG. 2b and FIG. 2c. These are schematic diagrams of the crossection of the principle components of the apparatus. The pickup (2) collects and delivers the loose fibrous material to the feeder-compactor mechanism (3), where it becomes partially compacted and then transferred into the bale forming chamber (6) through the feed-opening (5). At this point of operation the bale forming chamber is empty, therefore, no significant resistance occures against the transfer. As the bale forming chamber performs its pendulum-like motion the transferred and partially compacted fibrous material becomes loosely distributed over the retaining belts (7). The subsequently transferred material is exposed to the forces and movements exerted by the retaining belts and the already deposited material. As the bale forming chamber moves in the foreward direction, as shown on FIG. 2b. The newly transferred layer is pulled foreward and is deposited between the belts (7) and the previously deposited material. As the bale forming chamber reaches the limit of its foreward motion it is reversed. FIG. 2c illustrates the reversed motion of the bale forming chamber and the folded-like arrangement of the layers. During the bale forming cycle this reversing motion is maintained until the bale forming chamber is filled and the compaction of the fibrous material reaches the desired bale density.

Figures 3A, 3B:
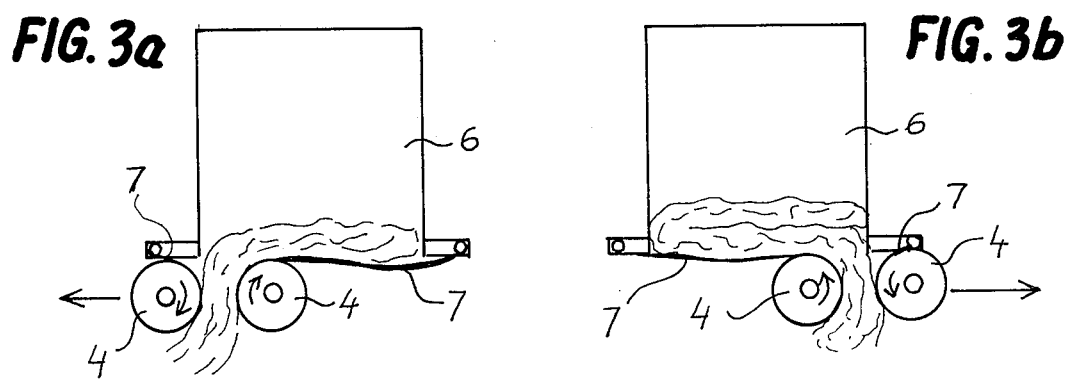
FIG. 3a is a schematic crossectional view of the bale forming apparatus in its configuration having the stationary bale forming chamber, and the power driven feeder-compactor mechanism in its foreward position
FIG. 3b is a schematic crossectional view of the apparatus with stationary bale forming chamber and power driven feeder-compactor assembly in its rear position.

FIG. 3a and FIG. 3b illustrates the same process, however, in the shown configuration of the apparatus the bale forming chamber remains stationary while the feeder-compactor mechanism performs the reversing oscillating relative motion. The method of transfer, deposition and compaction is identical to both configurations of the apparatus.

FIGS. 2a,b,c and FIGS. 3a,b show the principles of the apparatus in a vertical arrangement of the functional units. It is to be understood that the same principles apply to horizontal or any other configurations.

Figure 4:
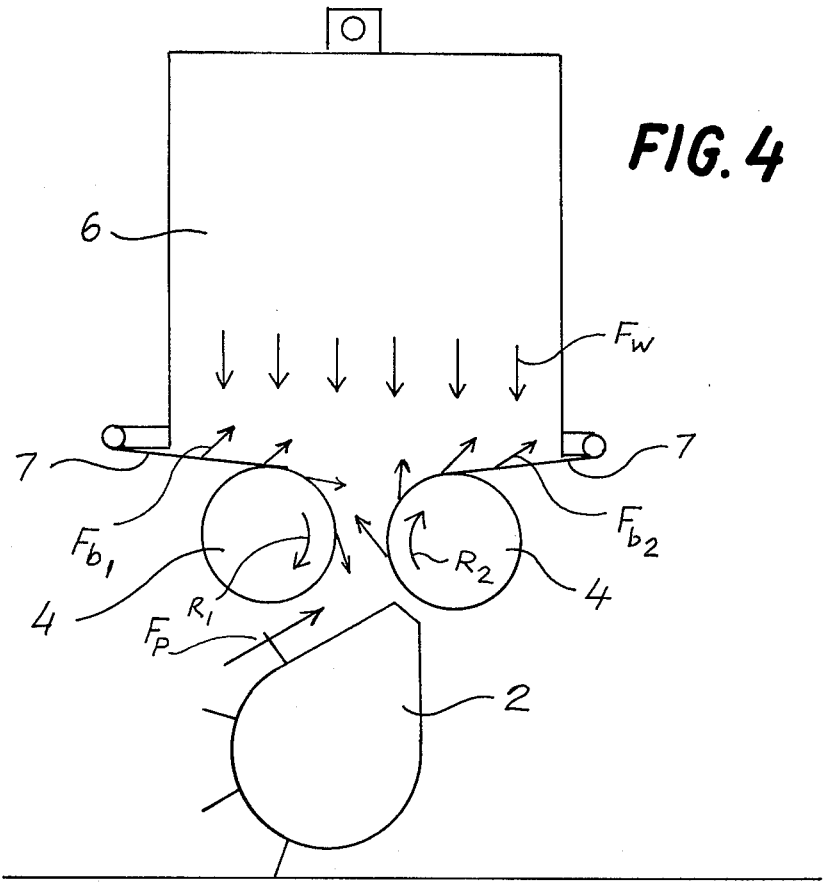
FIG. 4 is a schematic illustration of the forces acting on the layer of fibrous material during the rearward motion of the bale forming chamber.
Figure 5:
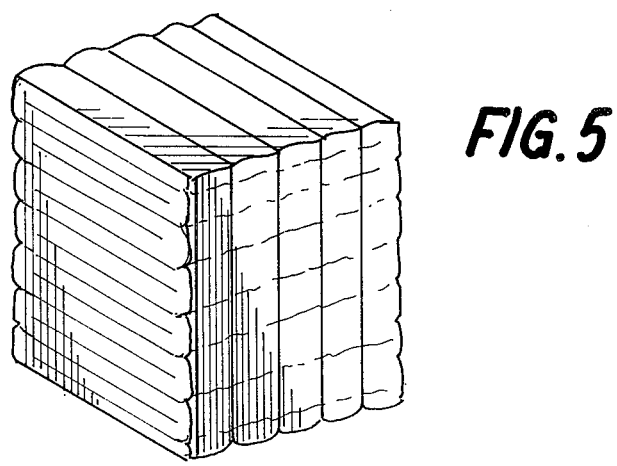
FIG. 5 is an isometric of the rectangular bale.

FIG. 4 is a schematic illustration of the apparatus, showing the location and approximate directions of the acting forces. In this figure no attempt was made to indicate the size of the forces. Fp is the rear-upward force exerted by the pickup on the loose incoming material. $Fb_1$ are the resultant forces exerted by the forward roller and belts. $R_1$ is the direction of rotation of the feeder-compactor rollers (4) during the rearward motion of the bale forming chamber. $Fb_2$ are the resultant forces exerted by the rear feeder-compactor roller and the belts during the rearward motion of the bale forming chamber. The rotation of the rear feeder-compactor roller is shown by the arrow $R_2$. The "opposing" rotations of the feeder-compactor rollers at the boundaries of the feed-opening (5) are inherent features of the apparatus, as the feeder-compactor rollers are interconnected by chain to assure their simultaneous rotations in identical directions. $F_w$ are the forces exerted by the weight of the deposited material and other related components of the apparatus.

Considering the functional role of the feeder-compactor rollers and the retaining belts in the transfer, deposition and compaction of the subsequent layers of the bale, the reasons for relatively even power distribution during the bale forming process can easily be recognized. It is a "rolling-compressing" function which is a highly efficient compacting method especially if the undesirable expansion of the already compacted material is prevented or reduced by the use of the retaining belts.

From FIG. 2 and FIG. 3 the simplicity of the method for the distribution of the incoming fibrous material between the foreward and rear boundaries of the bale forming chamber can also be seen.

I claim:

1. A method for forming substantially rectangular bales of fibrous material comprising the steps of; forming and transferring a continuous mat of the fibrous material along a feed opening through a primary pickup and a feeder-compactor mechanism into a bale chamber which is located above the said feeder-compactor mechanism, sad mat of said fibrous material transferred into the confined cavity of said bale chamber through its bottom boundary which is an open intake port, as said bale chamber performs a reversing or oscillating pendulum like motion relative to the said feeder-compactor mechanism, the confined cavity of said bale chamber and the said feed-opening remaining merged with each other without interruption throughout the reversing or oscillating motion of said bale chamber, allowing the continuous transfer and deposition of said mat of the fibrous material in folded-like arrangement in said confined cavity of said bale chamber at its bottom boundary between retaining belts, or the like, and the bottom layer of the partially completed bale, said partially completed bale being allowed to move in an upward direction within the confined cavity of the said bale chamber as subsequent new layers are being transferred and deposited, said subsequently transferred and deposited layers of the fibrous material being subjected to gradually increasing compressive forces exerted by the increasing weight of the partially completed bale and by frictional forces between the upward moving partially completed bale and the boundaries of the bale chamber, said upward movement of the partially completed bale not being restricted by movable platen, said deposited folded layers of said fibrous material being compressed to a desired density of the bale by said feeder-compactor mechanism after the upward movement of the partially completed bale is no longer allowed by the upper boundary of the said bale chamber while the transfer and deposition of additional layers is being continued.

2. A method for forming substantially rectangular bales of fibrous material comprising the steps of; forming and transferring a continuous mat of the fibrous material along a feed opening through a primary pickup and a feeder-compactor mechanism into a bale chamber which is located above the said feeder-compactor mechanism, said mat of said fibrous material being transferred into the confined cavity of said bale chamber through its bottom boundary which is an open intake port as said feeder-compactor mechanism performs a reversing or oscillating motion relative to the said bale chamber, said confined cavity of the said bale chamber and the said feed opening remaining merged with each other without interruption throughout the reversing or oscillating motion of the said feeder-compactor mechanism, allowing the continuous transfer and deposition of said mat of fibrous material in folded-like arrangement in said confined cavity of said bale chamber at its bottom boundary between retaining belts, or the like, and the bottom layer of the partially completed bale, said partially completed bale being allowed to move in an upward direction within the confined cavity of said bale chamber as subsequent new layers are being transferred and deposited, said subsequently transferred and deposited layers of the fibrous material being subjected to gradually increasing compressive forces exerted by the increasing weight of the partially completed bale and by frictional forces between the upward moving partially completed bale and the boundaries of the bale chamber, said upward movement of the partially completed bale not being restricted by movable platen, said deposited folded layers of said fibrous material being compressed to a desired density of the bale by the said feeder-compactor mechanism after the upward movement of the partially completed bale is no longer allowed by the upper boundary of the said bale chamber, while the transfer and deposition of additional layers is being continued.

3. The method of claims 1 or 2, in which the transfer of the fibrous material from the feed opening into the confined and at the beginning of the operation empty cavity of the said bale chamber is accomplished by the forces and displacement exerted on the fibrous material by a primary pickup mechanism.

4. The method of claims 1 or 2, in which the transfer of the fibrous material from the said feed opening into the said confined and partially filled cavity of the said bale chamber is accomplished by the forces and displacements exerted on the fibrous material by a primary pickup mechanism and by the forces and displacements exerted by the partially completed bale on the entering layers during the reversing or oscillating relative motion between the bale chamber and the feeder-compactor mechanism.

5. A method for forming substantially rectangular bales of fibrous material by transferring the loose fibrous material through a feeder-compactor mechanism into the confined cavity of a bale chamber through its open intake port, said bale chamber being positioned above the said feeder-compactor mechanism performing a reversing or oscillating pendulum-like motion relative to said feeder-compactor mechanism during the bale making process, the feed opening of said feeder-compactor mechanism and the said open intake port of said bale chamber remaining merged with each other without interruption throughout the said reversing or oscillating pendulum like motion of said bale chamber, said transferred fibrous material being deposited in subsequent folded-like layers within said confined cavity of said bale chamber such that the last of the subsequent layers to be deposited becomes the lower-most layer of the partially completed bale, said partially completed bale being allowed to move toward the upper boundary of the said bale chamber as the said subsequent layers are being deposited, said upward movement of the said partially completed bale being allowed without the restriction of a movable platen, said subsequently deposited folded-like layers receiving the final compaction by the feeder-compactor mechanism after the upward movement of the partially completed bale is no longer allowed by the upper boundary of the said bale chamber while the transfer and deposition of subsequent layers is being continued.

6. A method for forming substantially rectangular bales of fibrous material by transferring loose fibrous material through a feeder-compactor mechanism into the confined cavity of a bale forming chamber through its open intake port, said bale chamber being positioned above the said feeder-compactor mechanism, said feeder-compactor mechanism being positioned below said bale chamber and performing a reversing or oscillating motion relative to said bale chamber during the bale making process, the feed opening of said feeder-compactor mechanism and the open intake port of the said bale chamber remaining merged with each other without interruption throughout the said reversing or oscillating motion of said feeder-compactor mechanism, said transferred fibrous material being deposited in subsequent folded-like layers within the said confined cavity of said bale chamber such that the last of the subsequent layers to be deposited becomes the lower-most layer of the partially completed bale, said partially completed bale being allowed to move toward the upper boundary of the said bale chamber as the said subsequent layers are being deposited, said upward movement of the said partially completed bale being allowed without the restriction of a movable platen, said subsequently deposited folded-like layers receiving the final compaction by the feeder-compactor mechanism after the upward movement of the partially completed bale is no longer allowed by the upper boundary of the said bale chamber while the transfer and deposition of subsequent layers is being continued.

* * * * *